Aug. 14, 1956 W. V. SPURLIN 2,758,704
HYDRAULIC FLUID ACTUATED HELICAL FEEDERS
Filed Feb. 13, 1953 2 Sheets-Sheet 1

INVENTOR.
William V. Spurlin
BY
William D. Carothers
HIS ATTORNEY.

Aug. 14, 1956 W. V. SPURLIN 2,758,704
HYDRAULIC FLUID ACTUATED HELICAL FEEDERS
Filed Feb. 13, 1953 2 Sheets-Sheet 2

INVENTOR.
William V. Spurlin.
BY
William D. Carothers
HIS ATTORNEY.

2,758,704
HYDRAULIC FLUID ACTUATED HELICAL FEEDERS

William V. Spurlin, Indiana, Pa., assignor to Syntron Company, Homer City, Pa., a corporation of Delaware Application February 13, 1953, Serial No. 336,675

11 Claims. (Cl. 198—220)

This invention relates generally to vibratory feeder bowl conveyors and more particularly to fluid actuated vibratory feeder bowl conveyors.

Feeder bowl conveyors have been operated by means of electromagnetic motors wherein the feeder bowl provides its own reservoir for material to be fed. This bowl has an inclined track around its inner perimeter wall and is supported by flexible members such as rubber or leaf springs so that they will vibrate the bowl in an inclined arcuate path of movement about a central axis. The material in the reservoir is fed to the perimeter of the bowl and up the inclined track.

Such a feeder bowl is used to supply material in bulk, such as granular material or powdered material or it may be employed for arranging and supplying articles in turn as they are fed single file up the inclined track to the discharge. Different arrangements may be made for properly orientating the pieces being conveyed and if they are not properly orientated, they will be returned to the center of the feeder bowl and again supplied to the conveyor track. Those pieces properly orientated will be continuously fed to the outlet of the feeder bowl.

Electromagnetic motors for this character of feeder bowl operate to produce magnetic impulses in synchronism with the energizing current impulses. These magnetic impulses are applied vertically of the feeder, which is axially of the device, and symmetrical relative to the central axis of the helical conveying path. Electromagnetic vibrators of this character when excited by alternating current supplied through a half-wave rectifier, to space the current impulses, vibrate at the frequency equal to that of the current impulse supply. Electromagnetic vibration is exceedingly fast and of relatively low magnitude, and such a vibration is not conducive to conveying some articles and some types of material.

The principal object of this invention is the provision of a fluid actuated motor for supplying energy impulses axially of the helical conveyor track and which will operate the same at a lower frequency with a higher magnitude, a frequency much lower than that of the electromagnetic impulses and wherein the vibratory movement of the feeder is substantially greater than that of the electromagnetically operated device.

Another object of this invention is the provision of a fluid actuated piston supported to produce a vertical impulse substantially axially with the central axis of a spiral conveyor track for the purpose of conveying articles upwardly therealong. By the use of a fluid operated device, one may reduce the vibrations per minute and increase the magnitude to properly convey some articles that would be impossible to convey with a high frequency of the energy impulses obtained from the electromagnetic type of motor. Again, the application of the mechanical forces derived from the fluid actuated piston disposed on the central axis of the spiral conveyor induces a balanced motion that is conducive to good feeding of selected articles.

Another object of this invention is the provision of a fluid actuated motor disposed axially of a spiral feeder which will not provide any hazardous electrical conditions such as derived from the use of an electromagnetic motor.

Another object of this invention is the provision of a pneumatically operated motor disposed axially of a combined spiral and helical conveyor track.

Another object of this invention is the provision of a hydraulic piston, actuated by the pulsations of a hydraulic motor for the purpose of vibrating the helical conveyor track to convey articles unwardly therealong.

A fluid actuated device may be provided with a diaphragm or a piston which permits an exhaust of the actuating fluid through the device itself, and needs only an additional supply of fluid under pressure for the purpose of operating the same.

In the construction of the hydraulic device, it is necessary to provide a piston connected to the spiral conveyor track at the central axis thereof and arranged to be supplied with pulsations from a pump operated by a motor. The stroke and the quality of fluid supplied by the pump to the piston may be controlled in such a manner as to vary the stroke. Again the speed of the motor operating the pump may be varied to change the frequency of pulsations. By these means, one is enabled to accurately and properly adjust the feeding of this device to suit the conditions for which it is intended. Such a control over a very wide variation of amplitude provides a distinct improvement of the fluid actuated axially disposed motors over those of the electromagnetic type of motors regardless of whether pneumatic or hydraulic.

The fluid actuating motor comprising this invention has utility wherever this type of impulse motor is applicable.

Other objects and advantages appear hereinafter in the following description and claims.

The accompanying drawings show for the purpose of exemplification without limiting the invention and claims thereto, certain practical embodiments of the invention, wherein:

Fig. 3 is a schematic view of the hydraulic motor in the pumping arrangement as illustrated in Fig. 1.

Figure 1:
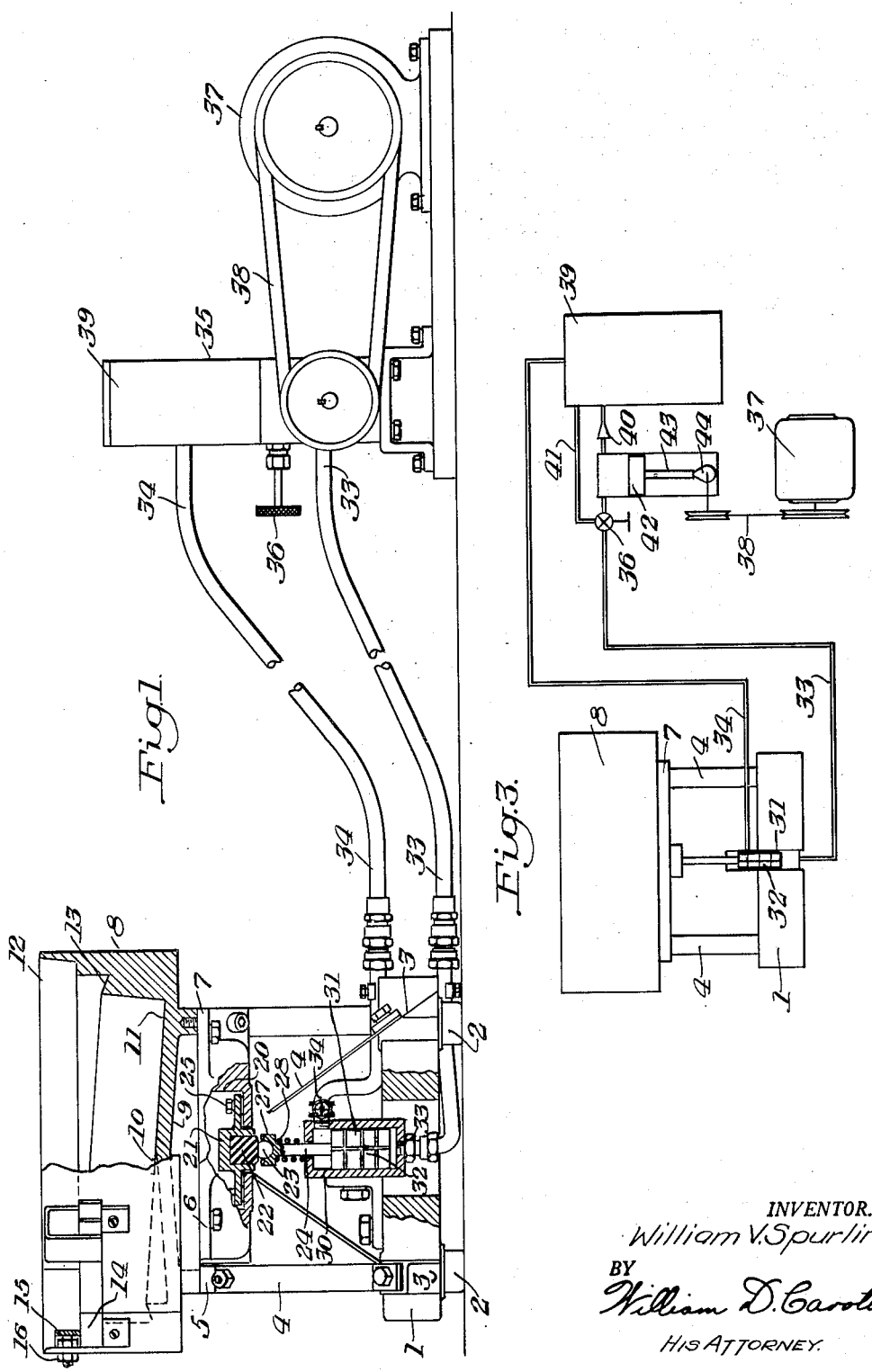
Fig. 1 is a view partly in side elevation and partly in section showing the hydraulic motor for operating the feeder bowl.
Figure 2:
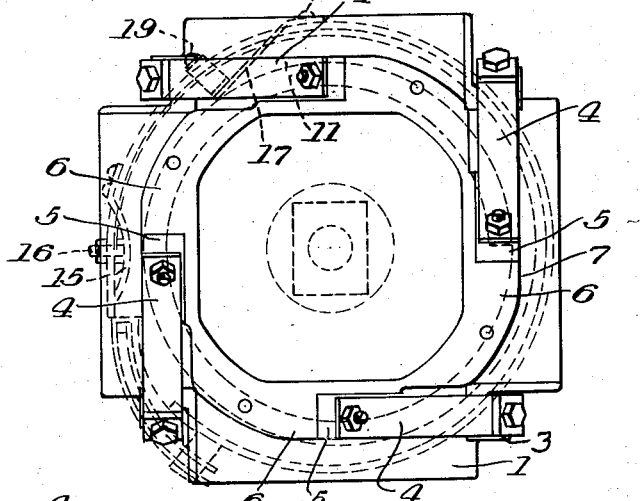
Fig. 2 is a plan view of the feeder bowl motor with the bowl indicated in dotted lines.

Referring to the drawings, the fluid actuated feeder bowl, as shown in Figs. 1, 2 and 3, is mounted on a massive base 1 supported by the rubber feet members 2. The base 1 is provided with sloping faces 3 for receiving the springs 4, to hold them in place and disposed at the angle as shown. The upper ends of the springs are attached to the sloping faces 5 on the lugs 6 that are secured to or formed integral with the frame member 7. The frame member 7 has the feeder bowl 8 secured thereto. The feeder bowl 8 is, in this instance, a casting having a hollow under portion 9, and a conical deck 10 which slopes toward the perimeter of the bowl. The inner face of the wall of the feeder bowl 8 is provided with a spiral track which starts at 11 flush with the deck and circles spirally upwardly around the bowl to the rim 12. The track slopes or pitches downwardly toward the wall as indicated at 13. Where the conveyor track approaches the rim of the bowl, the bowl is cut out to permit the track 14 to pass therethrough. This section of the track 14 is made of spaced rails to receive the articles passed from the conveyor's surface 11. A selector 15 is adjustably held in place by the bolt 16 and covers a portion of the track 11 for the purpose of rejecting the articles conveyed that are not properly orientated before they pass on to the track 14. The arm such as illustrated at 17 is held to the side wall of the feeder bowl 8 by means of the screw 18 at one end, and at the other end by the upwardly inverted U-shaped member as illustrated at 19. The abutment 17 is arranged over the track 11 so as to provide a means to eject an article that extends upwardly too high, which indicates that it is not properly orientated. Thus, one or more rejectors may be placed along the track for the purpose of rejecting the misaligned articles before they reach the discharge.

The frame 7 is provided with the hollow chamber 20 having an opening in the center thereof to receive the cap member 21, the central portion of which is provided with a resilient cushion such as the rubber cushion 22 which is disposed axially above and is contacted by the ball member 23 on the end of the piston 24. The cap member 21 is held in place by the bolts 25 on the end of the piston 24.

The axis of the piston is concentrically disposed relative to the feeder bowl 8 and the head 27 on the end of the piston is also used for the purpose of engaging the upper end of the spring 28 which surrounds the piston 24 and rests against the top of the housing 30 of the piston motor. The piston rod 24 extends into the chamber of the housing 30, and is connected to the piston 31 which has connected annular grooves 32 in the surface which extends a passage from one end of the piston to the other. The spring 28 on the piston rod holds the ball 23 up against the rubber cushion 24 at all times, and thus operation of the motor will not cause the ball to become disengaged from the rubber cushion. The ball may be flattened as indicated at the top thereof if so desired.

The casing 30 is provided with the inlet 33 and an outlet 34 which are connected to the pipes of the same reference member to the housing of the fluid pump 35. The pump is provided with an amplitude adjustment screw 36 that controls the by-pass valve for the pump. The hose connections of the lines 33 and 34 are flexible and cannot act as breathers. The pump 35 is operated by the electric motor 37 operating through the V-belt drive 38. The schematic structure of this device is illustrated in Fig. 3 wherein the pump has an oil reservoir 39 at the top thereof and is provided with a check valve 40 that allows oil to flow to the pump. The by-pass valve 36 determines the amount of fluid that travels back to the reservoir 39 through the by-pass line 41. The pump itself is provided with the piston 42 having a stem 43 actuated by a cam member 44 which in turn is operated through the V-belt drive 38 by the motor 37.

As previously disclosed, the vibrating piston 31 is provided with the leakage paths 32 for the purpose of permitting a slight portion of the fluid to escape each time the liquid impulse is applied on the bottom of the piston. The fluid that escapes returns back to the reservoir through the line 34. This permissive escape of a portion of the liquid in a pulsating line of this character delays the liquid in the line 33 from reversing in direction upon the suction stroke of the pump. The liquid in the line 33 does not reverse due to the suction of the piston 42, owing to the fact that a predetermined amount of the liquid can and does continue to flow through the leakage paths 32 of the servomotor 31. The piston 31 is thus made to function in synchronism with the operating piston 42. By controlling the by-pass and by controlling the speed of the motor 37 one is enabled to accurately control the stroke and the vibratory speed of the servomotor and thereby properly tune the motor to the tuning of the spring system when the feeder is loaded. This is an important feature of this invention because it is impossible to tune an ordinary electromagnetic motor to the spring system. The spring system of a vibratory system usually has to be tuned to the pulsations of the electric magnetic motor.

Figure 4:
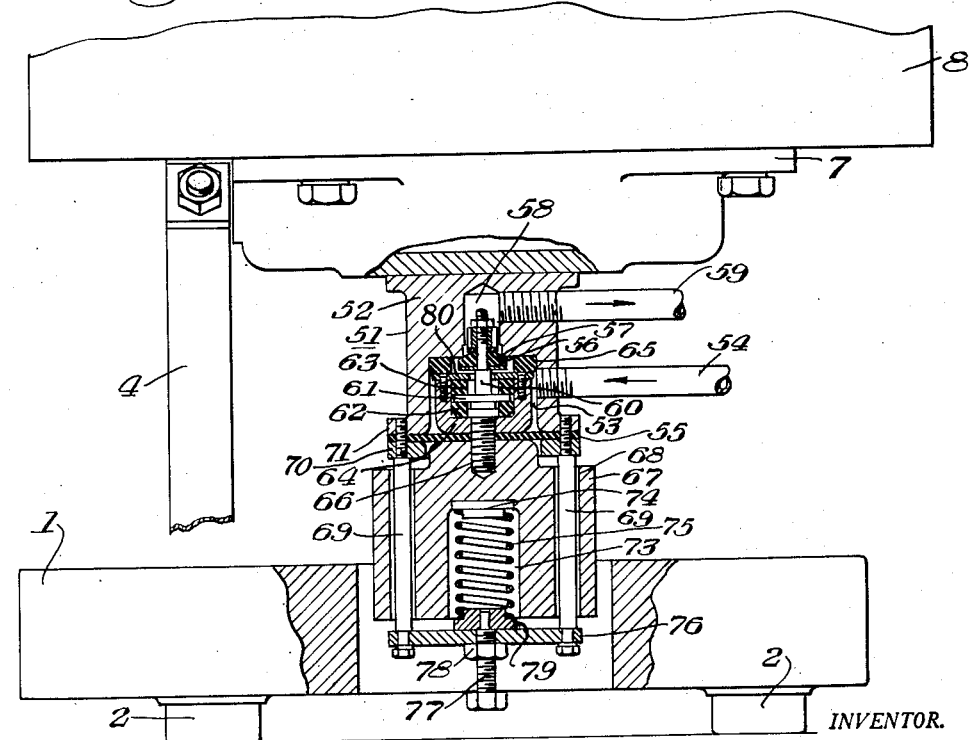
Fig. 4 is a vertical sectional view illustrating the fluid motor operated by gas under pressure such as compressed air with the parts shown in section.

The structure of mechanical parts of the feeder bowl as shown in Fig. 4 are the same as that illustrated in Fig. 1. The only difference being in the type of servomotor, which in this instance is a pneumatic motor that has an operating member that is axially disposed of the feeder bowl. As shown, the pump 51 is provided with a casing 52 having a chamber 53 supplied through the pipe line 54 with compressed air. When the air enters the chamber 53 it is effective to exert pressure against the diaphragm 55 that encloses the bottom end of the chamber 53. This pressure forces the diaphragm outwardly, and thus raises the valve 56 from its seat 57 allowing the air to escape up through the chamber 58 and out the exhaust line 59. The valve 56 is preferably made of a suitable soft material such as rubber and the valve stem 60 is provided with a circular head 61 that is positioned between the annular rubber cushion members 62 and 63, that are supported in the cup shaped frame 64 by the cap plate 80 that is cushioned against the top of the chamber 53 by the cushion ring 65 but is not sealed thereby. The cup 64 has a bolt 66 passing through the diaphragm 55 and is connected to the weight member 67, clamping the diaphragm therebetween. The weight member 67 has a series of openings 68 for receiving the bolts and sleeve assemblies 69 that hold the head 70 to the lower end of the casing, and thereby clamp the perimeter of the diaphragm 55. Thus, the bolt and sleeve assemblies 69 are disposed around the periphery of the pump 51, and are received in the flange 71 of the servomotor casing. The weight 67 is provided with a central chamber 73 which has a spring seat 74 at the upper end which is engaged by the helical spring 75, the lower end of which engages the seat 79 on the cross arm member 76 that is supported by the sleeve and bolt assemblies 69 that hold the head 70 on the casing. The bolt 77 and the lock nut 78 may adjust the lower seat 79 engaging the spring 75 so as to vary the pressure of the spring between the casing of the servomotor and the diaphragm and thus enable one to tune this pneumatic servomotor.

This motor functions as previously stated on the use of air or gas under pressure. The fluid pressure entering the chamber 53 expands the diaphragm 55 against the pressure of the springs 75, moving the cap 64 downwardly. The cushion 63 is compressed by this motion which delays the drawing of the valve stem 60 downwardly to draw the valve 56 from its seat 57. When the valve 56 is finally opened the fluid pressure rushes from the chamber 53 passed the cap plate 80 to the exhaust chamber 58 relieving the pressure from the diaphragm 55 and causing the spring 75 to quickly close the valve 56 before the fluid pressure has a chance to build up in the chamber 53. As soon as the valve 56 closes the pressure again builds up in the chamber 53 to expand the diaphragm 55 against the pressure of the springs 75. This impulse cycle is rapidly repeated to vibrate the feeder bowl 8. Flexible connections are made with the pipes 54 and 59. By tuning the compression of the spring 75 through the turning of the bolt 77 one is able to tune the motor so as to operate in substantial synchronism with the natural vibratory tuning of the feeder bowl. It is preferable to tune the servomotor to operate the feeder bowl to a few cycles more or less than the natural period of vibration of the device, whether it be pneumatic or electric or hydraulically actuated.

I claim:

1. A vibratory material handling device comprising a base, a plurality of inclined flexible members mounted on said base, material handling device means supported by said flexible members as a free body guided for reciprocation in a confined inclined lineal path of movement and at a predetermined natural period of vibration, a fluid motor including a fluid chamber mounted centrally of said flexible members and having a movable member therein, elastic cushion means interposed between said material handling device means and said movable member, and fluid pump means connected with said chamber to supply energy thereto for actuating said movable member to supply energy impulses to flex said flexible members and reciprocate said material handling device means along its guided lineal path and in synchronism with said energy impulses.

2. The structure of claim 1 characterized in that said chamber is anchored relative to said base.

3. The structure of claim 1 characterized in that said material handling device means comprises two separate members supported at opposite ends of said flexible means, and said chamber is anchored relative to one of said material handling device means.

4. The structure of claim 1 characterized in that said movable member is in the form of a piston and said material handling device means comprises two separate members supported at opposite ends of said flexible means, said cushioning means is interposed between said piston and each of said separate members, and said chamber is anchored relative to said base.

5. The structure of claim 1 characterized in that said movable member is a piston and said chamber includes a cylinder in which the piston operates, and which also includes means defining slots between the cylinder and the piston for the passage of fluid during the pressure stroke.

6. The structure of claim 1 characterized in that the fluid connections between the pump means on the motor are flexible hoses incapable of expansion.

7. The structure of claim 1 which also includes a fluid reservoir to receive fluid returned from said motor, and a by-pass valve connected from said pump means and said reservoir to vary the displacement applied to said fluid motor and thus vary the amplitude of reciprocation of the material handling device means.

8. The structure of claim 1 characterized in that said movable member is a piston and said chamber is a cylinder in which the piston operates, and which also includes spring means applied to said piston to maintain the same in contact with said cushion means.

9. A vibratory material handling device comprising a base, a plurality of inclined flexible members mounted on said base, material handling device means supported by said flexible members as a free body guided for reciprocation in a confined inclined lineal path of movement and at a predetermined natural period of vibration, a fluid motor mounted centrally of said flexible members and constructed to engage said material handling device, a fluid chamber disposed in said motor, a movable member in said chamber actuated by fluid under pressure admitted thereto for delivering an impulse axially of the material handling device to flex said flexible members and reciprocate said material handling device means along its guided lineal path and in synchronism with said energy impulses and elastic cushion means interposed between said movable member and the material handling device.

10. The structure of claim 9 characterized in that said chamber is closed at one end by a diaphragm and said movable member is secured to said diaphragm, and a weight member secured to said movable member on the other side of said diaphragm.

11. The structure of claim 9 characterized in that said chamber is closed at one end by a diaphragm and said movable member is secured to said diaphragm, and spring means engaging said movable member from the other side of said diaphragm for aiding in tuning the operation of said motor.

References Cited in the file of this patent
UNITED STATES PATENTS

| | | |
|---|---|---|
| 2,609,914 | Balsiger | Sept. 9, 1952 |
| 2,630,210 | Carrier et al. | Mar. 3, 1953 |